M. W. STEDMAN, G. F. KOPP & C. R. MYERS.
HAND RAKE.
APPLICATION FILED JUNE 5, 1913.
1,094,174.
Patented Apr. 21, 1914.
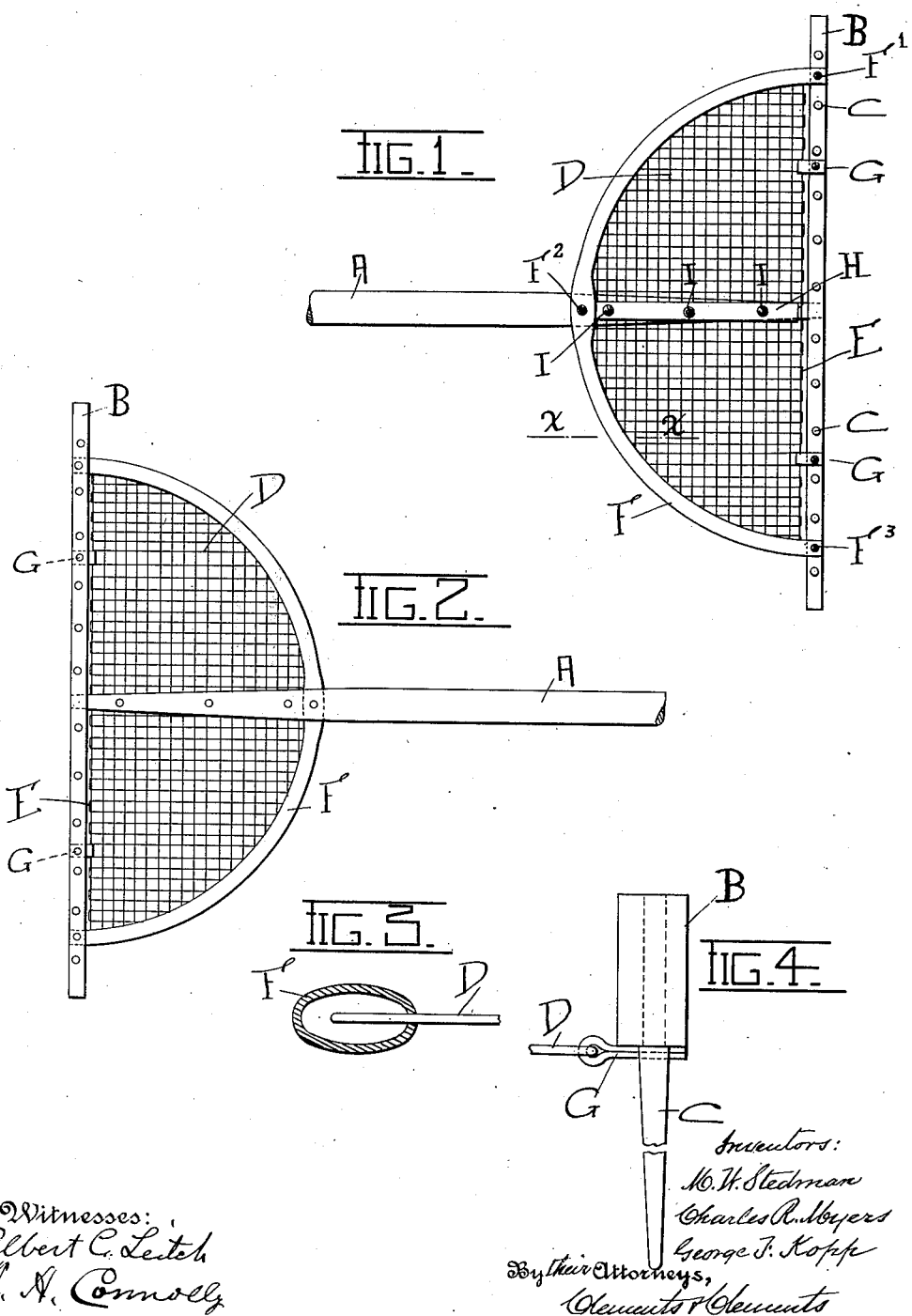

UNITED STATES PATENT OFFICE.

MARSHALL W. STEDMAN, GEORGE F. KOPP, AND CHARLES R. MYERS, OF TYRINGHAM, MASSACHUSETTS.

HAND-RAKE.

1,094,174. Specification of Letters Patent. Patented Apr. 21, 1914.

Application filed June 5, 1913. Serial No. 771,882.

*To all whom it may concern:*

Be it known that we, MARSHALL W. STEDMAN, GEORGE F. KOPP, and CHARLES R. MYERS, citizens of the United States, residing at Tyringham, in the county of Berkshire and State of Massachusetts, have invented certain new and useful Improvements in Hand-Rakes, of which the following is a specification.

Our improvement relates to a supporting means for hand rake heads, and more particularly to a type of wire mesh supporting means wherein a sufficient amount of girder strength is imparted to the point of connection between the head and handle to supply an article of more rigid and at the same time cheaper construction than any other form at present in use.

Our principal object is the production of a hand rake which will be inexpensive to manufacture, of rigid and durable construction, and embodying certain minor advantages to be later referred to.

In the usual form of commercial wooden hand rake there is a handle and a head portion disposed at right angles to each other, the stiffening and supporting means between the said members usually consisting of two or three wooden bows passing through holes in the handle and with their free ends bent down and secured to the head in a manner to form two or three (as the case may be) parallel bows. This form of construction with the present cost of material is too expensive.

In its broadest form our invention consists of a rake having a head and handle portion, a wire mesh cross lacing disposed between the head and handle portion, together with a supporting and binding means for the free ends of the said lacing.

Before referring specifically to the features of our improvement we wish to state that the arrangement of rake here shown is simply one form of design embodying our ideas. We do not wish to confine ourselves to the particular shape, proportions, material, or manner of securing the several elements. We shall expect, in the course of manufacture, to make the above stated and other mechanical alterations to suit different conditions, as long as we do not depart from the broad spirit of the improvement as set forth in the claims hereunto annexed.

In the drawings forming a part of this application and in which like reference characters indicate like parts in the several views, Figure 1 is a bottom plan view of a rake having a portion of the handle broken away; by bottom view we mean the side of the head from which the teeth extend. Fig. 2 is a top plan view. Fig. 3 is an enlarged sectional detail of the supporting and binding means for the wire mesh lacing, the view point being the line X—X of Fig. 1. Fig. 4 is a side view of an enlarged detail of a securing means between the wire mesh lacing and the rake head.

Referring specifically by reference characters to the elements, A is the handle portion, B the head having mounted therein a plurality of teeth C. Disposed between the head and the handle is an ordinary piece of commercial woven wire mesh lacing or screening D (of any desired number of strands per inch) having a selvage or finished edge E, and a hollow supporting and binding means F for the free ends of the said lacing or screening; the said means being secured at the points F', $F^2$ and $F^3$ in any desired manner. The clips or securing means G between the lacing and the head may be disposed at any suitable points in the manner shown by slipping them through the loops of wire formed by the selvage and securing the free ends to the head of the rake. A sheet metal clamping means H is secured at I by any desired means but in a manner tending to securely clamp the wire mesh to the rake handle in order to prevent transverse movement of the same.

We ascertained by experiments that it was not necessary to have the wire mesh lacing or screening secured to the supporting means F any more securely than would be effected by simply forcing the supporting means down over the lacing as shown in Fig. 3.

It is obvious that the screen or lacing serves the double purpose of furnishing a net to prevent particles from escaping over the top of the rake head, as well as providing a cheap form of supporting means for the head.

Having described our improvement, we claim as our invention and desire to secure by Letters Patent:

1. In a hand rake the combination with a handle and a head portion, of a lacing, a supporting means for the free ends of the said lacing, means for securing the said supporting means and the said lacing to the rake head, and a clamping means to clamp the lacing to the handle to prevent transverse movement of the lacing.

2. In a hand rake the combination with a handle and a head portion, of a woven wire mesh lacing, a supporting means for the free ends of said lacing, means for securing the ends of the said supporting means to the rake head, clips for securing the said lacing to the rake head, and a clamping piece to clamp the lacing to the handle to prevent transverse movement of the lacing.

3. In a hand rake the combination of a handle and a head portion, of a woven wire mesh lacing, a sheet metal strip having securing means for the strip through the said lacing and to the said handle portion, a metal supporting and binding means for the free or unfinished edge of the said lacing, the said means being secured to the outward ends of the said head and to the said handle portion, a selvage edge in the said lacing disposed near the head of the rake, and metal clips secured to the loops of the selvage edge and to the rake head, substantially as shown and described.

In testimony whereof we affix our signatures in presence of two witnesses.

MARSHALL W. STEDMAN.
GEORGE F. KOPP.
CHARLES R. MYERS.

Witnesses:
ALEX W. FORD,
CLAYTON W. MARKHAM.

---

Copies of this patent may be obtained for five cents each, by addressing the "Commissioner of Patents, Washington, D. C."